US011237334B2

(12) United States Patent
Horikoshi et al.

(10) Patent No.: US 11,237,334 B2
(45) Date of Patent: Feb. 1, 2022

(54) FIBER MODULE

(71) Applicant: NIPPON TELEGRAPH AND TELEPHONE CORPORATION, Tokyo (JP)

(72) Inventors: Kengo Horikoshi, Musashino (JP); Takashi Yamada, Musashino (JP); Hisao Yoshinaga, Musashino (JP); Shunsuke Kanai, Musashino (JP); Manabu Kubota, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/979,626

(22) PCT Filed: Feb. 28, 2019

(86) PCT No.: PCT/JP2019/007813
§ 371 (c)(1),
(2) Date: Sep. 10, 2020

(87) PCT Pub. No.: WO2019/176561
PCT Pub. Date: Sep. 19, 2019

(65) Prior Publication Data
US 2021/0041631 A1 Feb. 11, 2021

(30) Foreign Application Priority Data
Mar. 13, 2018 (JP) .............................. JP2018-046010

(51) Int. Cl.
*G02B 6/255* (2006.01)
*G02B 6/26* (2006.01)
(Continued)

(52) U.S. Cl.
CPC ......... *G02B 6/2937* (2013.01); *G02B 6/2552* (2013.01); *G02B 6/264* (2013.01); *G02B 6/3845* (2013.01); *G02B 2006/12109* (2013.01)

(58) Field of Classification Search
CPC .... G02B 6/2552; G02B 6/264; G02B 6/2937; G02B 6/3845; G02B 2006/12109
See application file for complete search history.

(56) References Cited

U.S. PATENT DOCUMENTS 4,958,897 A * 9/1990 Yanagawa ............ G02B 6/2938
385/50
5,325,456 A * 6/1994 Cullen .................. G02B 6/2551
359/484.03
(Continued)

FOREIGN PATENT DOCUMENTS

JP H07318751 A 12/1995
JP 200214253 A 1/2002
(Continued)

OTHER PUBLICATIONS

Satoshi Hirayama, Naohiro Muramatsu, Norihiko Nakamura, Katsumi Hanazono, Kazuhiko Ito, "Recent Development of Metro Access Filters." Aviation Electronics Technical Report. Mar. 2005. Machine translation attached.
(Continued)

*Primary Examiner* — Ryan A Lepisto
(74) *Attorney, Agent, or Firm* — Harness, Dickey & Pierce, P.L.C.

(57) ABSTRACT

A fiber module (1B) according to the present disclosure includes an input-side optical fiber (11), an output-side optical fiber (12), a ferrule (20) in which the input-side optical fiber and the output-side optical fiber are insertable in both ends and a groove (32) is formed in a direction orthogonal to a longitudinal direction (D1) in the middle of the longitudinal direction, a dielectric multilayer film filter
(Continued)

(30) inserted in the groove, and an input-side GI fiber (15) and an output-side GI fiber (16) joined by fusion to respective terminal portions of the input-side optical fiber and the output-side optical fiber. The dielectric multilayer film filter is interposed between an end surface (15f) of the input-side GI fiber and an end surface (16f) of the output-side GI fiber in the longitudinal direction.

12 Claims, 19 Drawing Sheets

(51) Int. Cl.
G02B 6/293 (2006.01)
G02B 6/38 (2006.01)
G02B 6/12 (2006.01)

(56) References Cited

U.S. PATENT DOCUMENTS

| | | | | |
|---|---|---|---|---|
| 6,048,103 | A * | 4/2000 | Furukata | G02B 6/3825 385/73 |
| 6,485,191 | B1 * | 11/2002 | Sato | G02B 6/4206 385/73 |
| 6,535,655 | B1 * | 3/2003 | Hasui | G02B 6/12007 385/11 |
| 6,813,416 | B2 * | 11/2004 | Pan | G02B 6/29389 385/33 |
| 6,892,009 | B2 * | 5/2005 | Ito | G02B 6/25 345/173 |
| 7,039,280 | B2 * | 5/2006 | Hata | G02B 6/2746 359/484.03 |
| 7,150,566 | B2 * | 12/2006 | Takimoto | G02B 6/2746 385/72 |
| 7,172,344 | B2 * | 2/2007 | Nishihara | G02B 6/29368 385/31 |
| 7,221,826 | B2 * | 5/2007 | Hanashima | G02B 6/12007 385/129 |
| 9,229,170 | B1 * | 1/2016 | Wang | G02B 6/32 |
| 10,473,860 | B1 * | 11/2019 | Xia | G02B 6/29382 |
| 2003/0206690 | A1 | 11/2003 | Hwang et al. | |

FOREIGN PATENT DOCUMENTS

| | | |
|---|---|---|
| JP | 2006345474 A | 12/2006 |
| JP | 2009205105 A | 9/2009 |
| WO | WO-2011083781 A1 | 7/2011 |

OTHER PUBLICATIONS

Yasuyuki Inoue, Motohisa Ishii, Yasuhiro Hida, Masahiro Yanagisawa, Keitaka Enomoto, "PLC Technology for Optical Access Supporting FTTH." NTT Technology Journal, vol. 17, No. 5, 2005, pp. 16-19. Machine translation attached.

* cited by examiner

DIFFUSED LIGHT

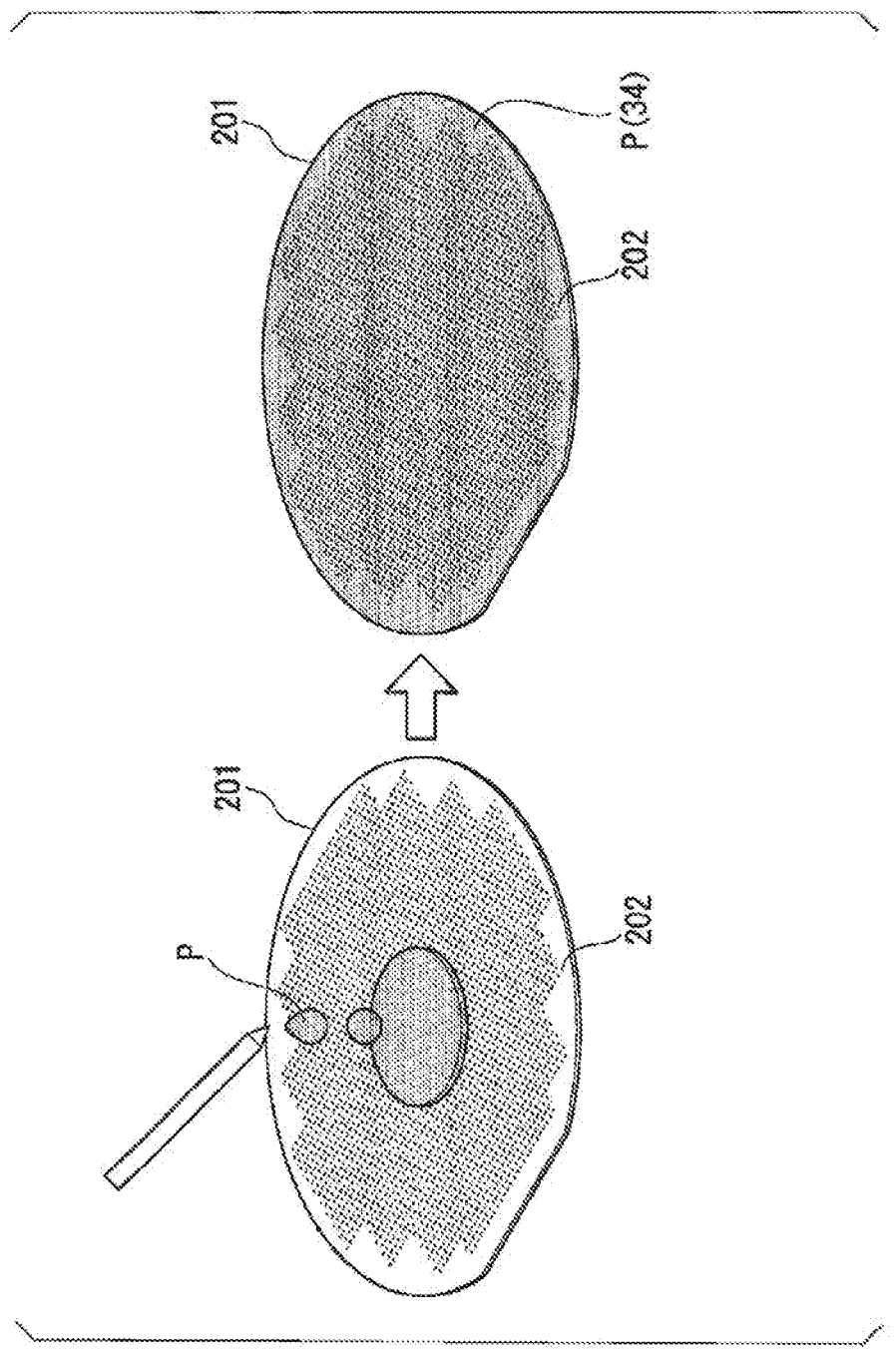

FIBER MODULE

CROSS-REFERENCE TO RELATED APPLICATIONS

This application is a 371 U.S. National Phase of International Application No. PCT/JP2019/007813, filed on Feb. 28, 2019, which claims priority to Japanese Application No. 2018-046010 filed on Mar. 13, 2018. The entire disclosures of the above applications are incorporated herein by reference.

TECHNICAL FIELD

The present disclosure relates to a fiber module.

BACKGROUND ART

In general, dielectric multilayer film filters have been widely used in optical filters such as an optical bandpass filter, a longpass filter, and a shortpass filter. For example, as disclosed in Non-Patent Literature 1, a dielectric multilayer film filter that can be manufactured on a substrate of silicon or the like is combined with a spatial optical system configured with a lens, a mirror, or the like and approximately exhibits designed performance with respect to collimated light.

A method of applying an optical filter using such a dielectric multilayer film filter to an optical system (hereinafter, may be referred to as an SMF optical system) configured with a single mode fiber (hereinafter, SMF) is broadly divided into two methods.

A first method is a method of converting light emitted from an end surface of the SMF into collimated light using a collimator lens, causing the collimated light to be transmitted through the dielectric multilayer film filter, and coupling the transmitted light to the SMF again using the collimator lens. In a manufacturing process of an optical system in the first method, precise alignment work is necessary for coupling the SMF optical system to the spatial optical system. Thus, the optical system is expensive. In addition, the spatial optical system such as the collimator lens has a larger size than the optical fiber. Thus, there is a limit to size reduction. From the viewpoint of achieving size reduction, a gradient-index lens may be used instead of a molded lens that is usually used in the collimator lens. In a case where the gradient-index lens is used, size reduction can be achieved. However, precise alignment work is still required, and the problem of expensiveness remains.

As illustrated in FIG. 1A, in the first method, for example, two collimator lenses 104 and 104 and a dielectric multilayer film filter 106 are arranged between end surfaces 102$f$ and 102$f$ of two SMFs 102 and 102 that are arranged such that the end surfaces 102$f$ and 102$f$ face each other. Luminous flux incident on the dielectric multilayer film filter 106 is converted into collimated light by the collimator lenses 104 and 104. In such a configuration, for example, optical characteristics are unlikely to deteriorate. However, the size of the entire configuration is likely to be increased.

A second method of applying the optical filter using the dielectric multilayer film filter to the SMF optical system is a method of forming a slit in an optical waveguide and inserting a thin-film-shaped dielectric multilayer film filter into the formed slit (for example, refer to Non-Patent Literature 2). As disclosed in Non-Patent Literature 2, a technology for manufacturing a thin-film-shaped dielectric multilayer film filter using a polyimide film as a substrate has been established. Specifically, a slit is formed in a ferrule, and the dielectric multilayer filter is inserted into the slit. The SMF optical system (fiber module) including the dielectric multilayer film filter can be manufactured by inserting an input side and an output side of an optical fiber wire from both ends of the ferrule, filling a gap between the ferrule and the optical fiber wire with an optical adhesive, and fixing the ferrule and the optical fiber wire. In such a configuration, the alignment work is not necessary. Thus, the fiber module can be inexpensively manufactured. In addition, an element such as a lens is not used. Thus, the size of the fiber module can be reduced.

A problem of the second method is optical characteristics. That is, light incident on the dielectric multilayer film filter is diffused light and is not collimated light. Thus, incident light passes through the multilayer film at various angles of incidence. Thus, light distribution characteristics of the dielectric multilayer film filter significantly change compared to the light distribution characteristics in a case where the incident light is collimated light. In particular, in a case where rectangularity of having a steep rise and fall in transmission characteristics is required as the light distribution characteristics, incidence of the diffused light results in an unclear transmission spectrum, and the transmission characteristics change from a rectangular shape and deteriorate. Thus, in the second method, for example, it is difficult to implement an optical bandpass filter having a small half width or a longpass filter or a shortpass filter having steep transition characteristics.

As illustrated in FIG. 1B, in the second method, for example, a thin-film-shaped dielectric multilayer film filter 108 is interposed between the end surfaces 102$f$ and 102$f$ of the two SMFs 102 and 102. Such a configuration enables small size and low cost manufacturing. However, a problem of occurrence of optical loss arises in addition to the change of the optical characteristics from desired optical characteristics due to the incidence of the diffused light on the dielectric multilayer film filter 108 as described above.

CITATION LIST

Non Patent Literature

Non-Patent Literature 1: Satoshi Hirayama, Takahiro Muramatsu, Norihiko Nakamura, Katsumi Hanazono, and Kazuhiko Ito; "Development of Filter for Latest Metro Access Network System", JAE Technical Report, No. 28 (2005.3)

Non-Patent Literature 2: Yasuyuki Inoue, Motohaya Ishii, Yasuhiro Hida, Masahiro Yanagisawa, and Yoshitaka Enomoto; "PLC Technology for Optical Access Supporting FTTH", NTT GIJUTU Journal, pp. 16-19 (2005.5)

SUMMARY OF THE INVENTION

Technical Problem

As described above, in the two methods of applying the optical filter using the dielectric multilayer film filter to the SMF optical system, it is difficult to implement a small size and inexpensive fiber module that has rectangular light distribution characteristics having a steep rise and fall, and the problem of deterioration of the light distribution characteristics is present.

The present disclosure is conceived in view of the above matter. An object of the present disclosure is to provide a fiber module that can be inexpensively manufactured in a small size and exhibits favorable light distribution characteristics.

Means for Solving the Problem

A fiber module of the present disclosure includes an input-side optical fiber, an output-side optical fiber, a ferrule in which the input-side optical fiber and the output-side optical fiber are insertable in both ends and a groove is formed in a direction orthogonal to a longitudinal direction, a dielectric multilayer film filter inserted in the groove, and an input-side graded index fiber and an output-side graded index fiber joined by fusion to respective terminal portions of the input-side optical fiber and the output-side optical fiber, in which the dielectric multilayer film filter is interposed between an end surface of the input-side graded index fiber and an end surface of the output-side graded index fiber in the longitudinal direction. In the present disclosure, the input-side graded index fiber and the output-side graded index fiber are graded index lens fibers or graded index multimode fibers as will be described later.

In the fiber module of the present disclosure, a length of the input-side graded index fiber is adjusted such that luminous flux emitted from an end surface of the input-side optical fiber forms a beam waist at a position of the dielectric multilayer film filter, and a length of the output-side graded index fiber is adjusted such that luminous flux passing through the dielectric multilayer film filter is coupled to the output-side optical fiber at a predetermined coupling efficiency.

In the fiber module of the present disclosure, a cross section of a lower portion of the groove has a V shape, and the dielectric multilayer film filter is fitted in a bottom portion of the groove.

In the fiber module of the present disclosure, the dielectric multilayer film filter includes a thin-film portion that is thinner than a surrounding part.

In the fiber module of the present disclosure, the dielectric multilayer film filter is arranged inclined at greater than or equal to 5° and less than or equal to 10° with respect to a plane orthogonal to an optical axis, and the end surface of each of the input-side graded index fiber and the output-side graded index fiber abuts on the dielectric multilayer film filter while inclined at greater than or equal to 5° and less than or equal to 10° with respect to the plane orthogonal to the optical axis and is optically polished.

In the fiber module of the present disclosure, an extending direction of the groove forms an angle of greater than or equal to 80° and less than or equal to 90° with respect to the longitudinal direction of the ferrule.

Effects of the Invention

According to the present disclosure, a fiber module that can be inexpensively manufactured in a small size and exhibits favorable light distribution characteristics can be implemented.

BRIEF DESCRIPTION OF DRAWINGS

FIG. 1A illustrates one example configured using the first method in the related art, FIG. 1B illustrates one example configured using the second method in the related art, and FIG. 1C illustrates one example to which the present disclosure is applied.

FIG. 2A relates to an SMF, FIG. 2B relates to a graded index lens fiber, and FIG. 2C relates to a graded index multimode fiber.

FIG. 3A is a cross-sectional view when the fiber module is cut in a longitudinal direction, and FIG. 3B is an enlarged view of a region R illustrated in FIG. 3A.

FIG. 4A is a perspective view, and FIG. 4B is a side view.

FIG. 5A is a perspective view, and FIG. 5B is a side view.

FIG. 6A is a cross-sectional view, and FIG. 6B is a perspective view.

FIG. 7A is a cross-sectional view, and FIG. 7B is a perspective view.

FIG. 9A illustrates a state where a protrusion is formed, and FIG. 9B illustrates a state where a polyimide resin is spin-coated.

FIG. 10 is a schematic diagram for describing the method of manufacturing the dielectric multilayer film filter illustrated in FIGS. 6A and 6B.

FIGS. 11A and 11B illustrate a process of forming a dielectric multilayer film, and FIG. 11C illustrates a state after a substrate is peeled from a support layer.

FIGS. 14A and 14B illustrate a state where the substrate is coated with the polyimide resin, and FIG. 14C illustrates a state where recess processing is performed on the support layer.

FIGS. 15A and 15B each illustrate a state where the dielectric multilayer film is deposited on the support layer, and FIG. 15C illustrates a state where the substrate is peeled from the support layer.

DESCRIPTION OF EMBODIMENTS

Hereinafter, an embodiment of the present disclosure will be described with reference to the drawings. The embodiment described below is an example of embodiment of the present disclosure, and the present disclosure is not limited to the following embodiment. Embodiments can be combined with each other as far as possible. In the present specification and the drawings, configurations having the same functions are designated by the same reference signs, and descriptions of such configurations are not repeated.

Figures 2A, 2B, 2C:
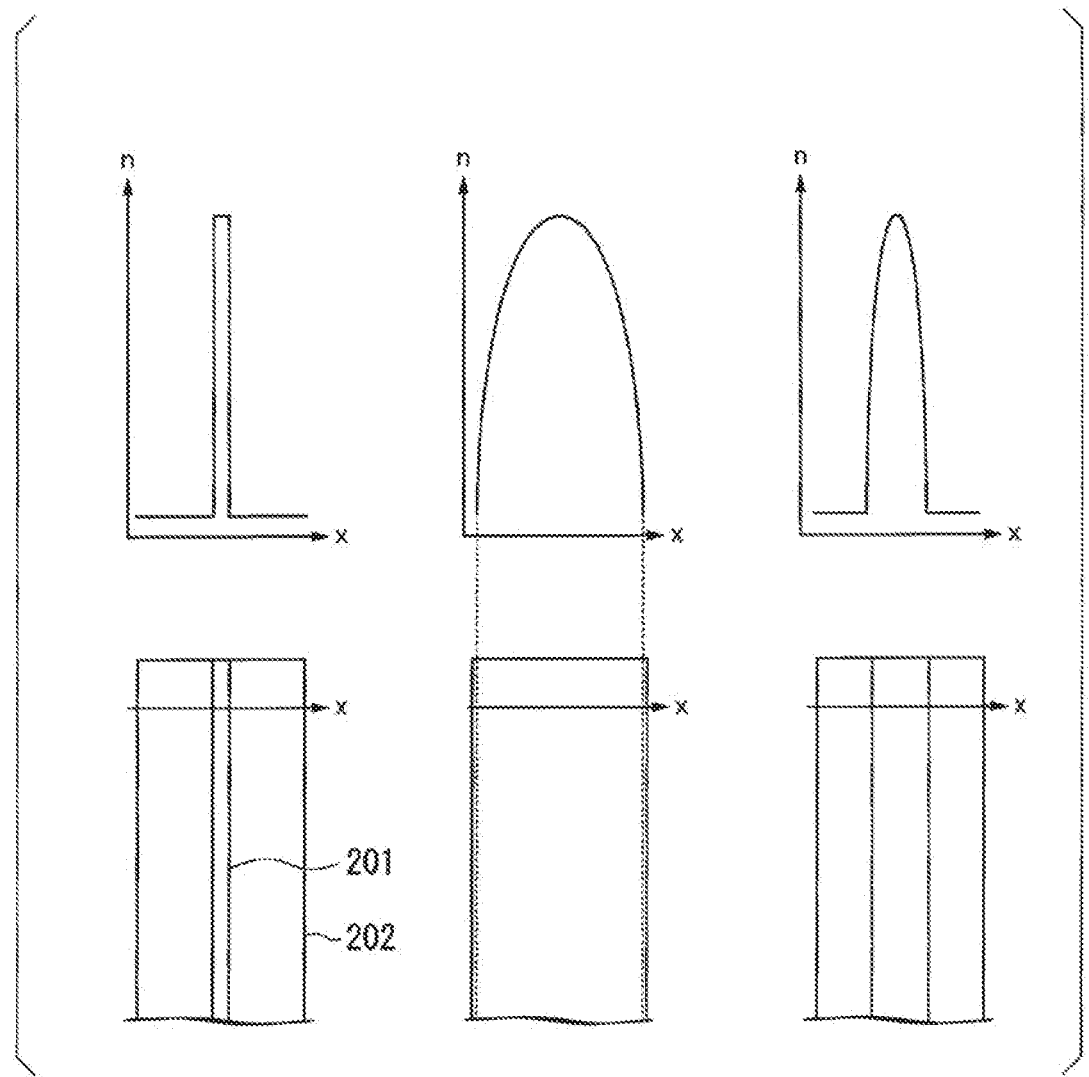
FIGS. 2A to 2C are refractive index distributions (upper part) and side views of end portions of various fibers.

As illustrated in FIG. 2A, an SMF includes a core 201 having a certain refractive index and a cladding 202 having a lower refractive index than the core 201. A refractive index distribution in the upper part is designed such that light propagating in the core 201 has only one transverse mode. In the SMF that has a significantly small core diameter and is used for a general communication wavelength band, a cladding diameter is 125 µm, and the core diameter is approximately 9 µm or 10 µm.

As illustrated in FIG. 2B, a graded index lens fiber (hereinafter, a GI lens fiber) has a structure in which a refractive index n changes in a cross-sectional direction (x direction illustrated in FIG. 2). The refractive index n is increased as the refractive index n approaches the center of the x direction. The GI lens fiber is used as a gradient-index lens.

As illustrated in FIG. 2C, the core diameter of a graded index multimode fiber (hereinafter, GI-MMF) is approximately 50 µm and is relatively larger than the SMF or the like. Light propagating in the core 201 includes a plurality of transverse modes. The core 201 has a structure in which the refractive index n changes in the x direction. The refractive index n of the core 201 is increased as the refractive index n approaches the center of the x direction.

Figure 3A:
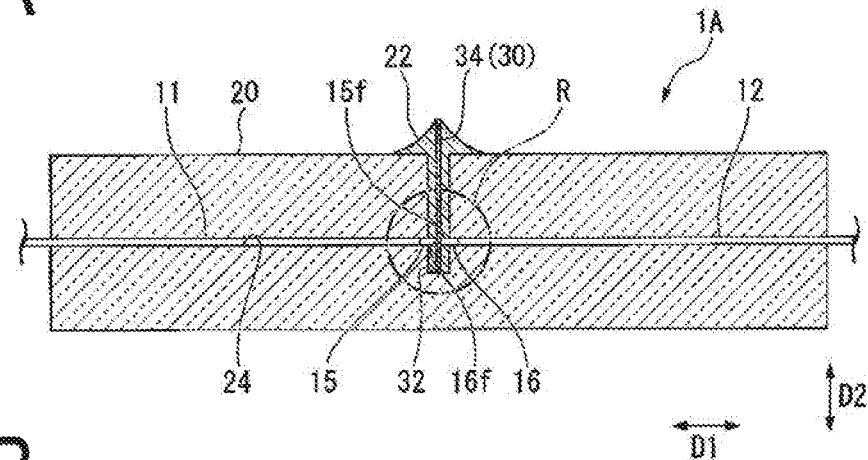
FIGS. 3A and 3B are diagrams of a fiber module of a first aspect according to the present disclosure.

As illustrated in FIG. 3A, a fiber module 1A of a first aspect includes an input-side optical fiber 11, an output-side optical fiber 12, a ferrule 20, a dielectric multilayer film filter 30, an input-side graded index fiber (hereinafter, a GI fiber) 15, and an output-side GI fiber 16. The input-side optical fiber 11 and the output-side optical fiber 12 are insertable in both ends of the ferrule (support) 22. In addition, a groove 32 in a cross-sectional direction (direction orthogonal to a longitudinal direction D1) D2 is formed at a predetermined position (in the present embodiment, a center portion) of the ferrule 22 in the longitudinal direction D1. The dielectric multilayer film filter 30 is inserted in the groove 32.

Figure 3B:
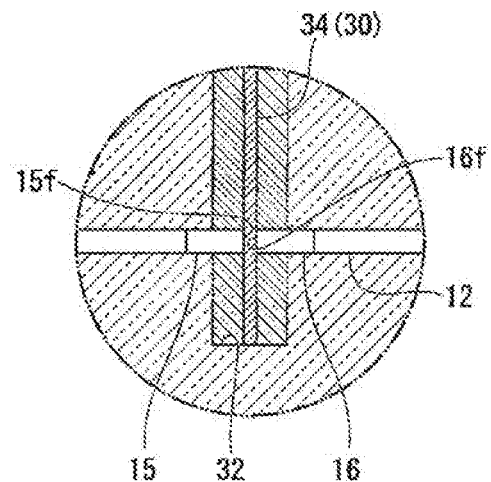

In the present embodiment, each of the input-side optical fiber 11 and the output-side optical fiber 12 is the SMF. The input-side GI fiber 15 and the output-side GI fiber 16 are the GI lens fibers or the GI-MMFs having the same cladding diameter as the SMFs of the input-side optical fiber 11 and the output-side optical fiber 12, respectively. The input-side GI fiber 15 is joined by fusion to a terminal portion (end portion on the output-side fiber 12 side) of the input-side optical fiber 11. The output-side GI fiber 16 is joined by fusion to a terminal portion (end portion on the input-side fiber 11 side) of the output-side optical fiber 11. The ferrule 22 is configured such that the input-side optical fiber 11 and the output-side optical fiber 12 are insertable in the longitudinal direction D1 from both ends toward the center of the longitudinal direction D1. As illustrated in FIG. 3B, the dielectric multilayer film filter 30 is interposed between an end surface 15$f$ of the input-side GI fiber 15 and an end surface 16$f$ of the output-side GI fiber 16 in the longitudinal direction D1.

The dielectric multilayer film filter 30 is manufactured in a thin-film shape on a polyimide substrate. Specifically, a polyimide film as a support layer is formed on a quartz, glass, or silicon substrate, and a dielectric multilayer film designed to have desired light distribution characteristics is manufactured on the polyimide film. Then, the thin-film-shaped dielectric multilayer film filter 30 is manufactured by peeling the polyimide film from the quartz substrate. A material as the support layer is not particularly limited, but a material such as the polyimide film having a refractive index not causing deterioration of optical characteristics is preferable. An example of a method of manufacturing the dielectric multilayer film filter 30 will be described later.

A ferrule made of zirconia can be applied to the ferrule 22 as a platform fixing the substrate and the optical fiber. Specifically, the groove 32 for inserting the thin-film-shaped dielectric multilayer film filter 30 is formed by dicing in the ferrule made of zirconia. The thin-film-shaped dielectric multilayer film filter 30 is inserted into the groove 32, and the input-side optical fiber 11 and the output-side fiber 12 of which the input-side GI fiber 15 and the output-side GI fiber 16 are joined by fusion to tip ends are inserted from both ends of the ferrule 22 in the longitudinal direction D1. Last, the inside of the groove 32 and the vicinity of an opening end of the groove 32 are fixed using an optical adhesive 22. In such a structure, high precision processing of a fiber insertion hole 24 for inserting the input-side optical fiber 11 and the output-side fiber 12 can be implemented by using the ferrule made of zirconia. By simply causing the input-side optical fiber 11 and the output-side fiber 12 to pass through the fiber insertion hole 24, optical alignment in a plane orthogonal to the longitudinal direction C1 can be performed in the same manner as a usual SC connector or MU connector.

Figure 1A:
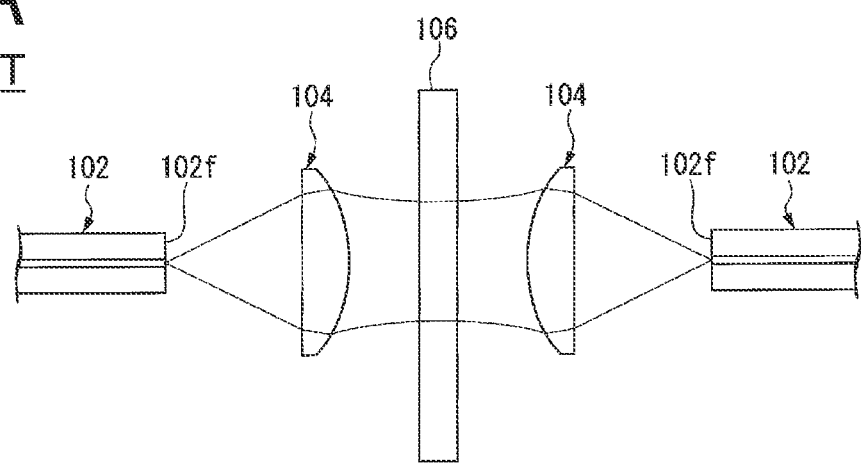
FIGS. 1A to 1C are side views of fiber modules.
Figure 1B:
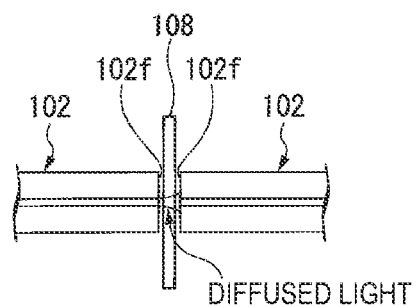
Figure 1C:
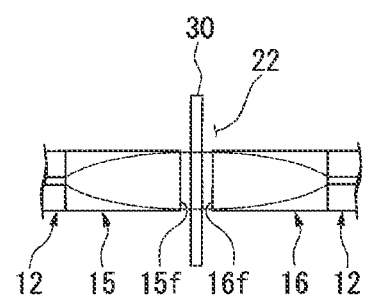

A structure around the dielectric multilayer film filter 30 corresponds to FIG. 1B or FIG. 1C. It is necessary to arrange the length of the GI lens fiber or the GI-MMF constituting the input-side GI fiber 15 and the output-side GI fiber 16 to be efficiently coupled to the facing GI lens fiber or GI-MMF after light emitted from each fiber forms a beam waist. Specifically, the term efficiently represents that 95% or more of light emitted from the GI lens fiber or the GI-MMF constituting the input-side GI fiber 15 and the output-side GI fiber 16 is incident on the facing GI lens fiber or GI-MMF, and means that a coupling efficiency is greater than or equal to 95%.

The dielectric multilayer film filter 30 is arranged in accordance with the position of the beam waist of the light emitted from the input-side GI fiber 15 and the output-side GI fiber 16. By causing the input-side GI fiber 15 and the output-side GI fiber 16 to abut from both sides of the dielectric multilayer film filter 30 in the longitudinal direction D1, the dielectric multilayer film filter 30 and the end surfaces 15$f$ and 16$f$ physically come into close contact with each other, and an angular deviation of the dielectric multilayer film filter 30 is prevented.

Zirconia has hardness that is twice the hardness of stainless steel or more, and the toughness of zirconia is the highest of fine ceramics. Thus, in a case where a thin blade is used in usual processing of a groove for inserting the dielectric multilayer film filter 30 by dicing, the blade breaks or cracks, and it is difficult to perform the processing. Meanwhile, in the structure of the present embodiment, as illustrated in FIGS. 3A and 3B, the dielectric multilayer film filter 30 is fixed by bringing the input-side GI fiber 15 and the output-side GI fiber 16 into close contact with both end surfaces of the dielectric multilayer film filter 30. Thus, the processing width (width in the longitudinal direction D1) of the groove 32 can be set to any width, and processing using a relatively thick blade having a thickness sufficiently large for the thickness of the dielectric multilayer film filter 30 is also advantageous from the viewpoint of manufacturing.

Figure 4A:
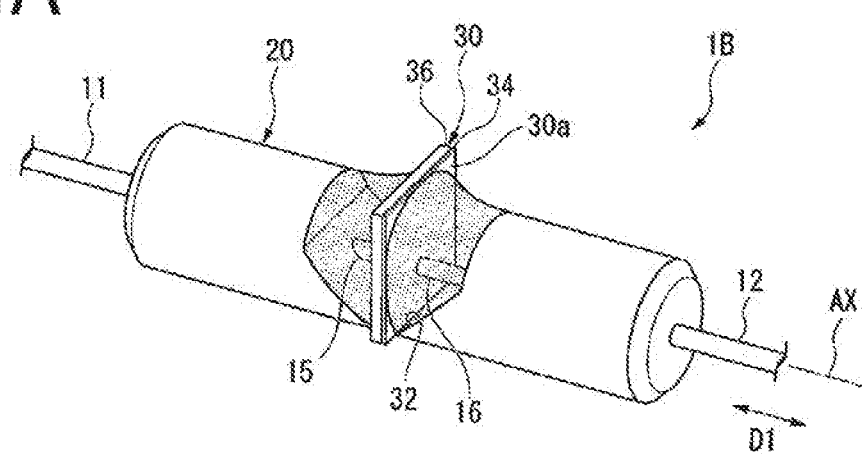
FIGS. 4A and 4B are diagrams of a fiber module of a second aspect according to the present disclosure.
Figure 4B:
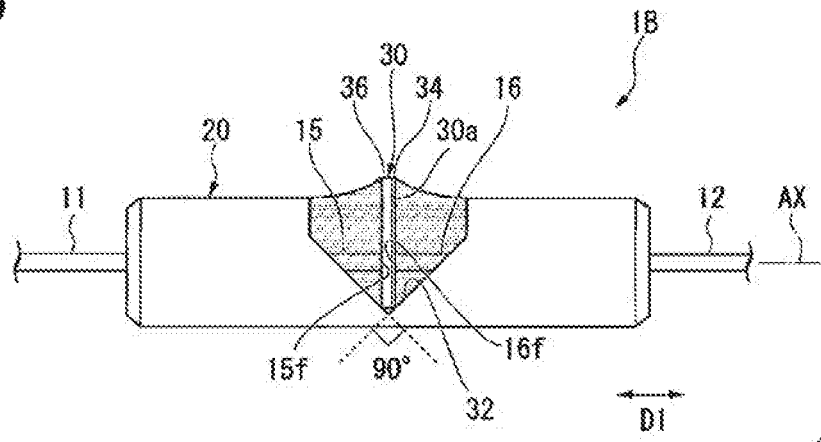

As illustrated in FIGS. 4A and 4B, a fiber module 1B of a second aspect in which the groove 32 is formed using a V-shaped blade of which the tip end of the blade has an opening angle of 90° is exemplified. In the fiber module 1B, one of degrees of freedom of an angle formed between a surface 30a of the dielectric multilayer film filter 30 and an optical axis AX is fixed in order to fix the dielectric multilayer film filter 30 to a bottom portion of the V-shaped groove 32. Thus, optical characteristics are stabilized.

Figure 5A:
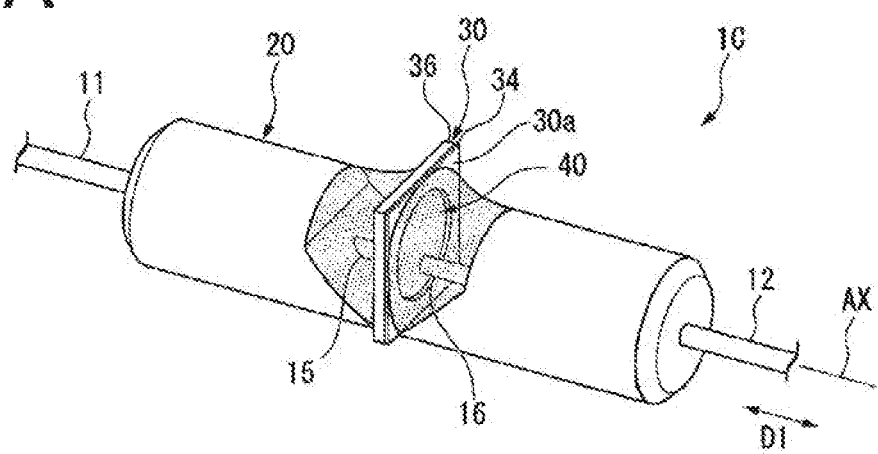
FIGS. 5A and 5B are diagrams of a fiber module of a third aspect according to the present disclosure.
Figure 5B:
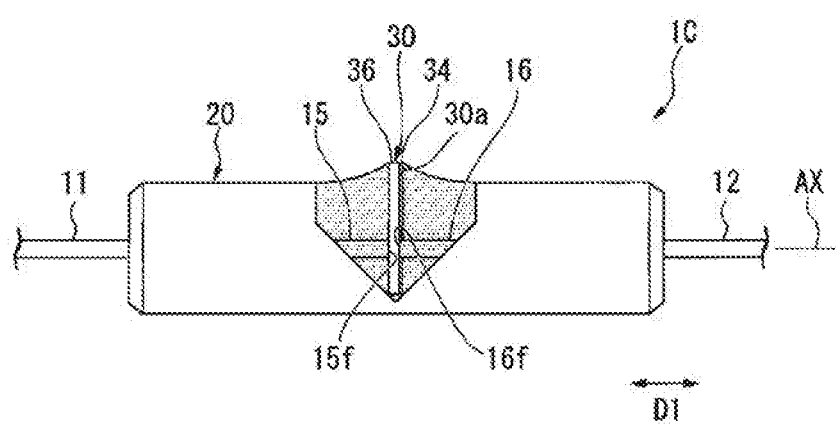

FIGS. 5A and 5B illustrate a structure of a fiber module 1C of a third aspect in which a region 40 in which the input-side GI fiber 15 and the output-side GI fiber 16 abut on a support layer 34 formed of a polyimide film is partially thinned in order to further reduce optical insertion loss.

Figure 6A:
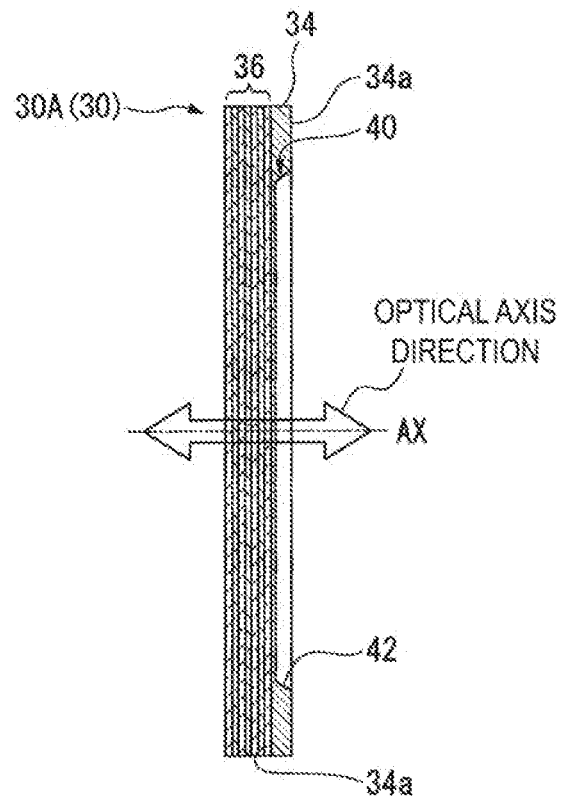
FIGS. 6A and 6B are diagrams of a dielectric multilayer film filter of a fiber module according to the present disclosure.
Figure 6B:
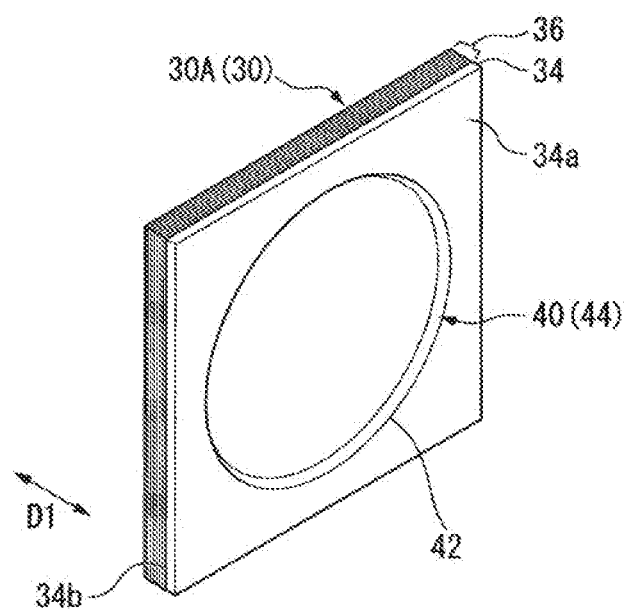

FIGS. 6A and 6B illustrate one example of a structure of a substrate transfer type dielectric multilayer film filter 30A. A recess 42 is formed on a surface 34a of the support layer 34 of polyimide or the like by receiving the shape of a projecting protrusion part disposed in a substrate, not illustrated. A dielectric multilayer film 36 is formed on a surface 34b of the support layer 34 on the opposite side from the surface 34a having the recess 42. By causing the input-side GI fiber 15 and the output-side GI fiber 16 to abut on the recess 42, the optical insertion loss of the support layer 34 can be reduced.

Figure 7A:
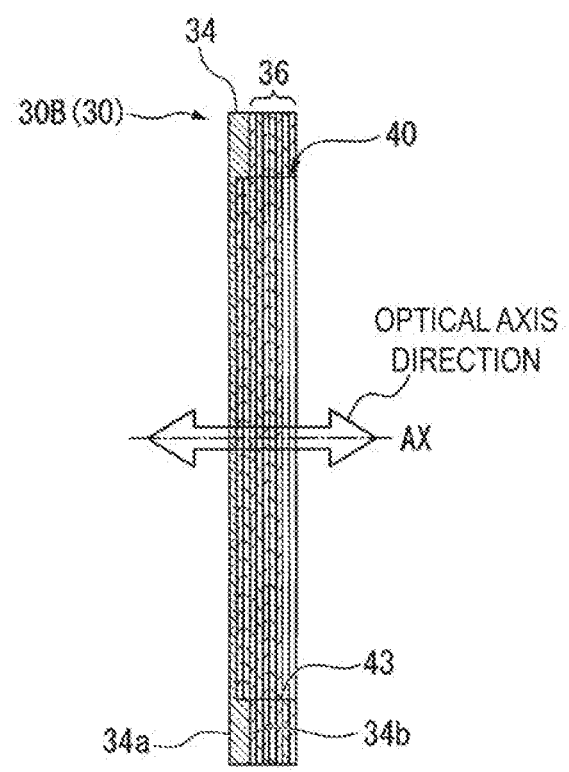
FIGS. 7A and 7B are diagrams of another dielectric multilayer film filter of the fiber module according to the present disclosure.
Figure 7B:
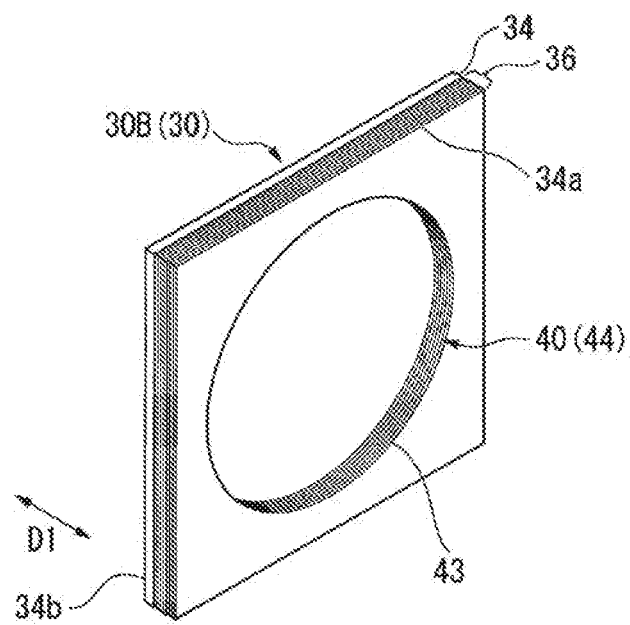

FIGS. 7A and 7B illustrate a structure of a dielectric multilayer film filter 30B in which a recess 43 is directly processed on the surface 34b of the support layer 34. The recess 43 can be formed using a method of photolithography using a photosensitive material as the support layer 34 or an etching method using another resist. The dielectric multilayer film 36 is formed on the surface 34b of the support layer 34 having the recess 42. In both structures of the dielectric multilayer film filters 30A and 30B, the film thickness and the etching depth of the support layer 34 are adjusted such that the thin support layer 34 remains on the bottom surfaces of the recesses 42 and 43. In a step after etching, the dielectric multilayer film 36 does not peel, detach, or break.

Figure 8:
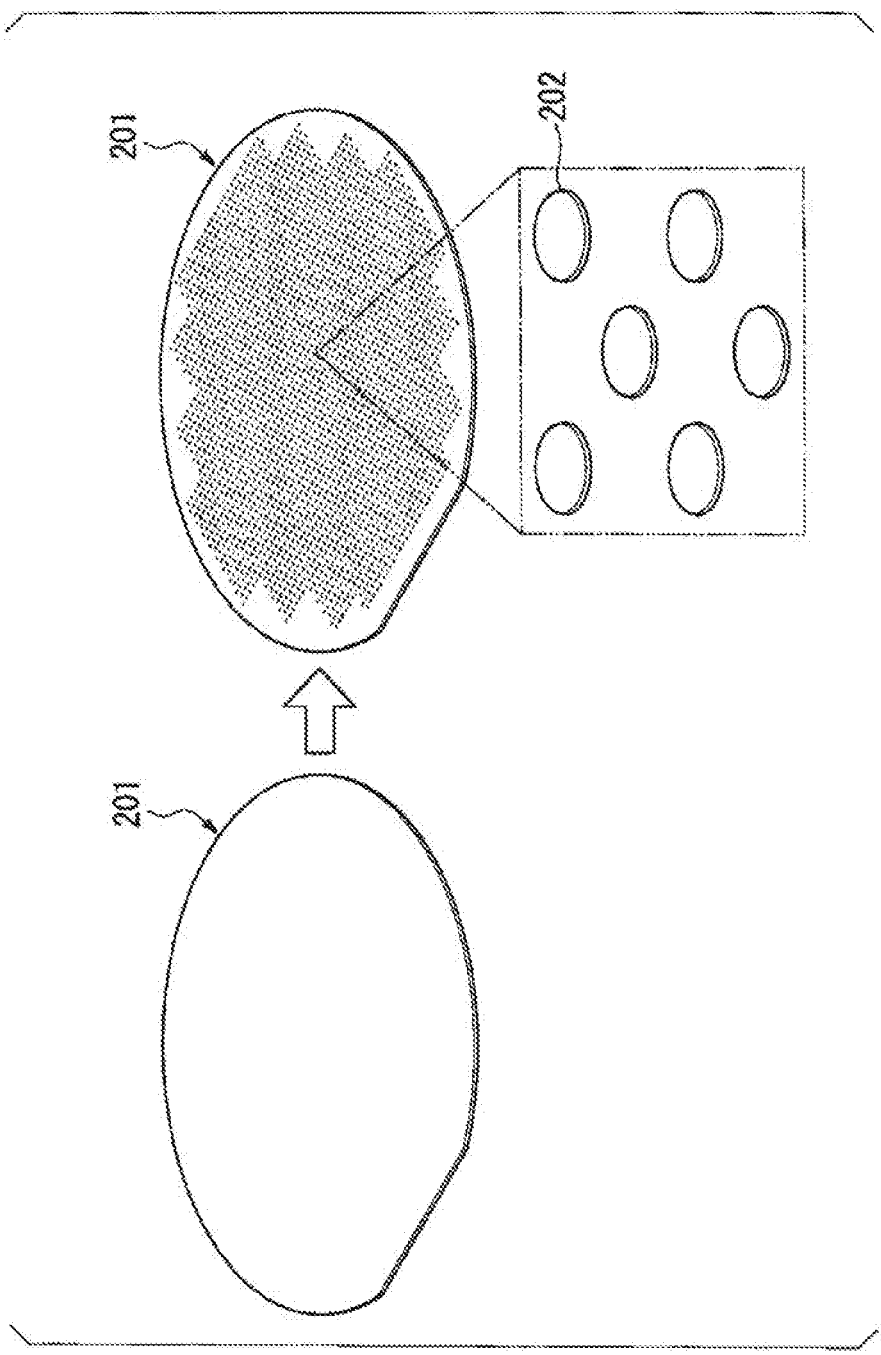
FIG. 8 is a schematic diagram for describing a method of manufacturing the dielectric multilayer film filter illustrated in FIGS. 6A and 6B.
Figure 9A:
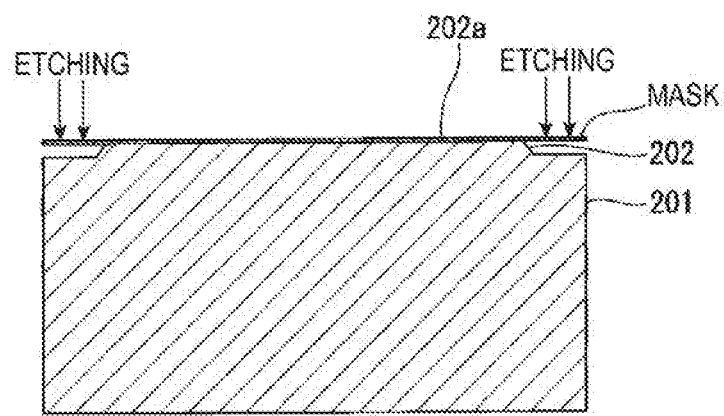
FIGS. 9A and 9B are schematic diagrams for describing the method of manufacturing the dielectric multilayer film filter illustrated in FIGS. 6A and 6B.
Figure 9B:
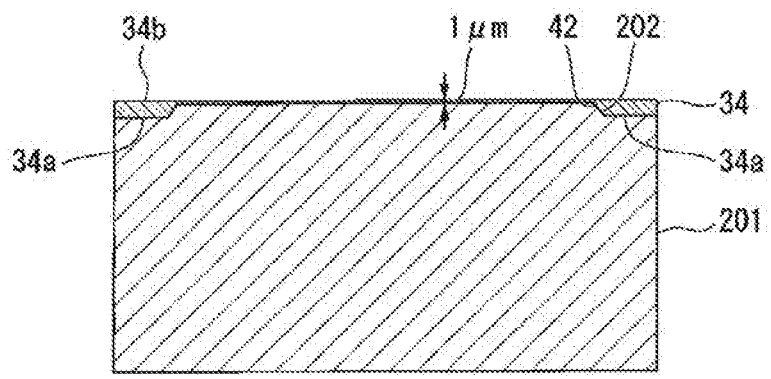
Figure 11A:
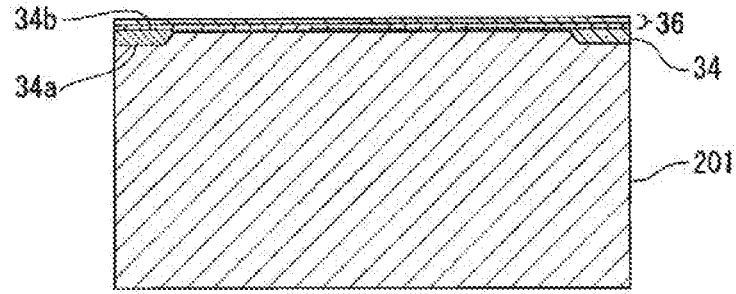
FIGS. 11A to 11C are schematic diagrams for describing the method of manufacturing the dielectric multilayer film filter illustrated in FIGS. 6A and 6B.
Figure 11B:
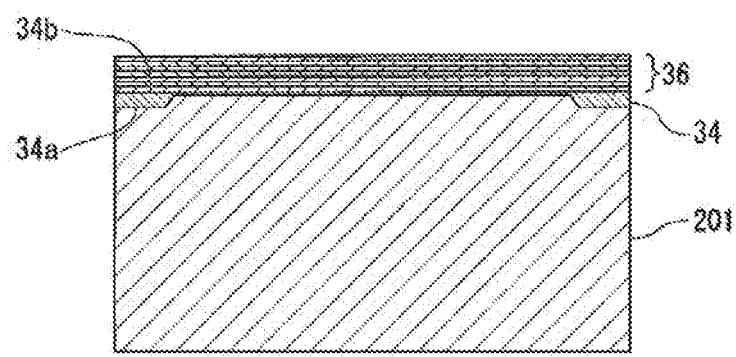
Figure 11C:
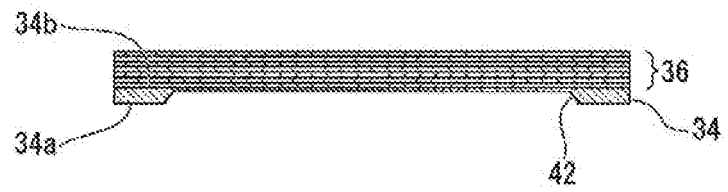
Figure 12:
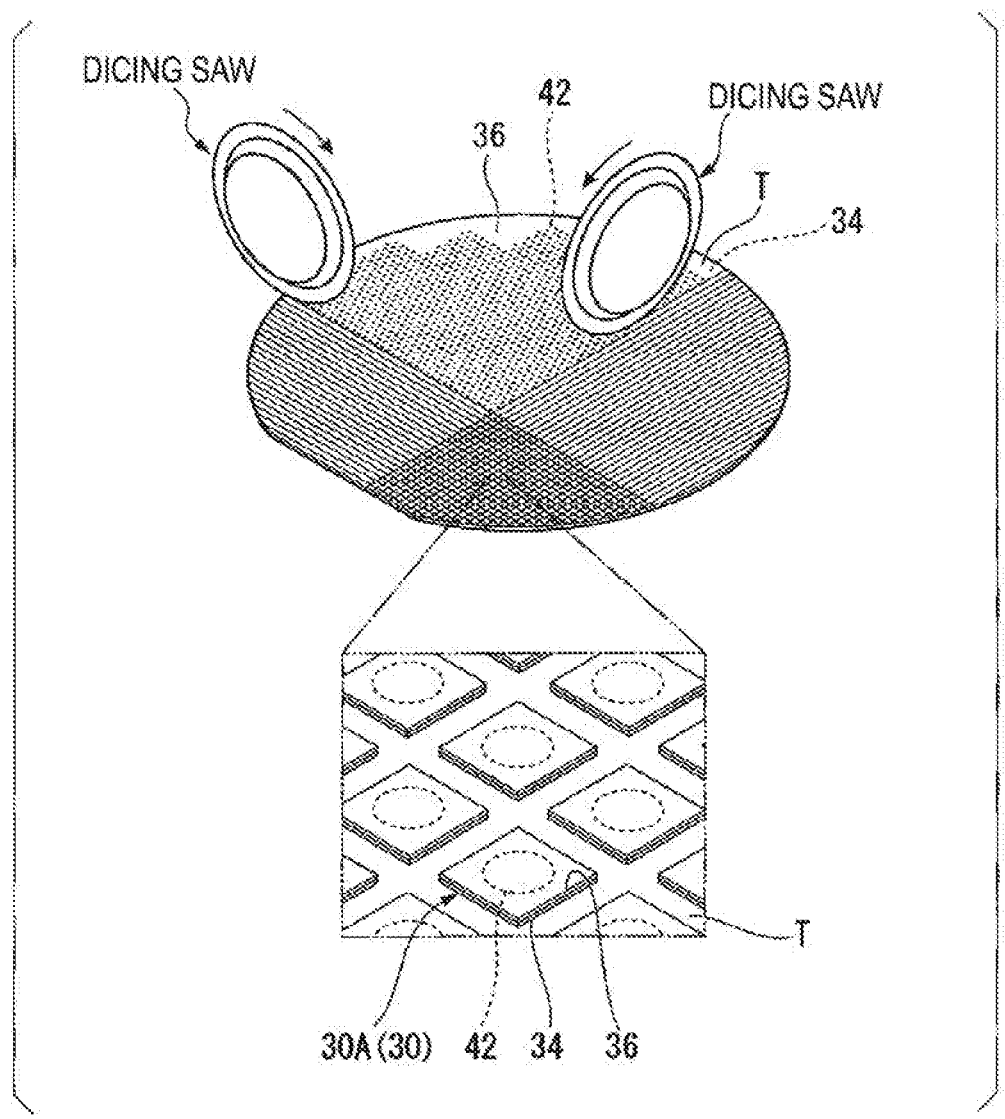
FIG. 12 is a schematic diagram for describing the method of manufacturing the dielectric multilayer film filter illustrated in FIGS. 6A and 6B.

FIG. 8 to FIG. 12 illustrate an example of a method of manufacturing the substrate transfer type dielectric multilayer film filter 30A. In the method of manufacturing the substrate transfer type, first, as illustrated in FIG. 8 and FIG. 9A, the protrusion 202 having a height of approximately a few μm is formed by etching in the substrate 201 of silicon or the like. Then, as illustrated in FIG. 9B and FIG. 10, a polyimide resin P as the support layer 34 of the dielectric multilayer film filter 30A is applied by spin coating, and then, the support layer 34 is formed by curing the polyimide resin P. At this point, as illustrated in FIG. 9B, the amount of application of the polyimide resin P is adjusted such that the support layer 34 having a thickness of approximately 1 μm remains on a top surface 202a of the protrusion 202 disposed in the substrate 201. The recess 42 is formed adjacent to the protrusion 202 on the surface 34a of the support layer 34. Then, as illustrated in FIGS. 11A and 11B, the dielectric multilayer film 36 is deposited by sputtering or the like on the surface 34b of the support layer 34. After completion of deposition, as illustrated in FIG. 11C, the substrate 201 is peeled from the support layer 34, and the support layer 34 is bonded to a dicing tape T. Next, as illustrated in FIG. 12, the support layer 34 and the dielectric multilayer film 36 are cut into a chip by dicing around the recess 42. Manufacturing can also be performed in a case where the order of the steps of substrate peeling and dicing is switched. However, in the case of switching, cleaning and pickup after the substrate peeling are performed in units of chips, and the amount of manufacturing time is expected to be increased.

Figure 13:
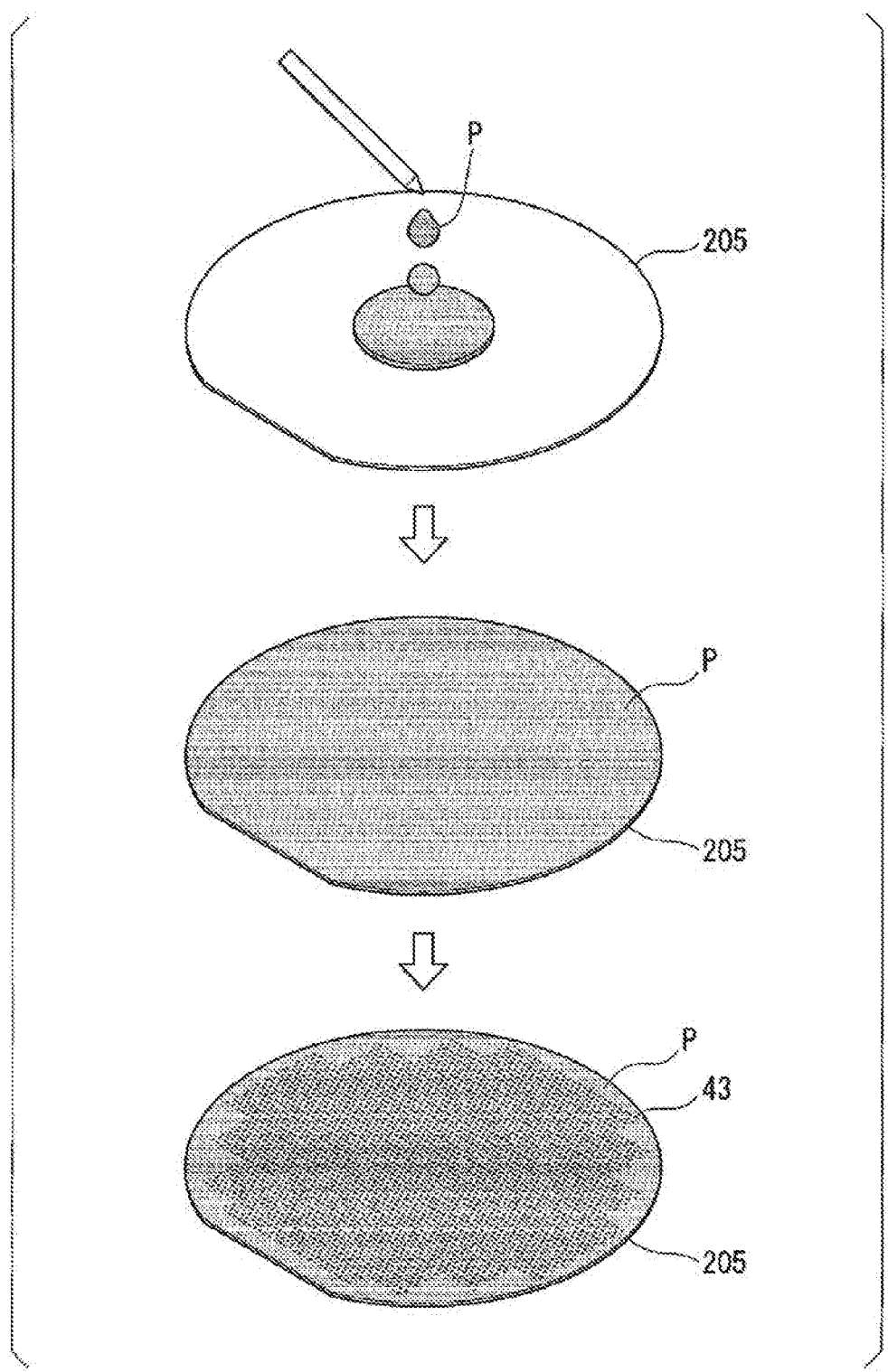
FIG. 13 is a schematic diagram for describing a method of manufacturing the dielectric multilayer film filter illustrated in FIGS. 7A and 7B.
Figure 14A:
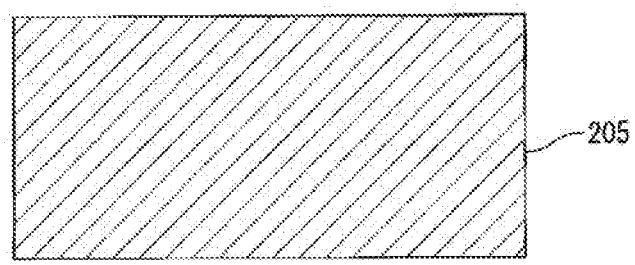
FIGS. 14A to 14C are schematic diagrams for describing the method of manufacturing the dielectric multilayer film filter illustrated in FIGS. 7A and 7B.
Figure 14B:
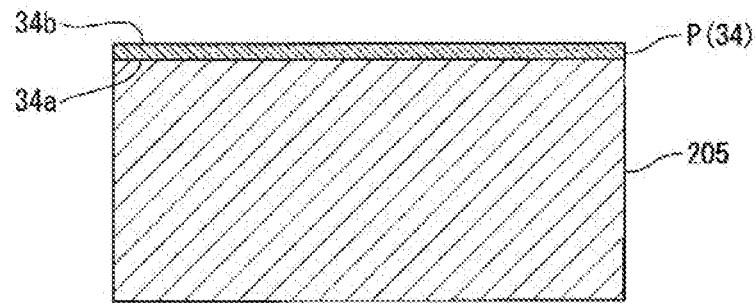
Figure 14C:
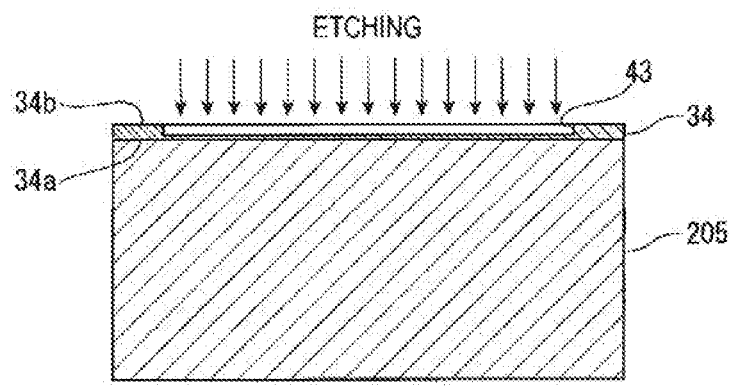
Figure 15A:
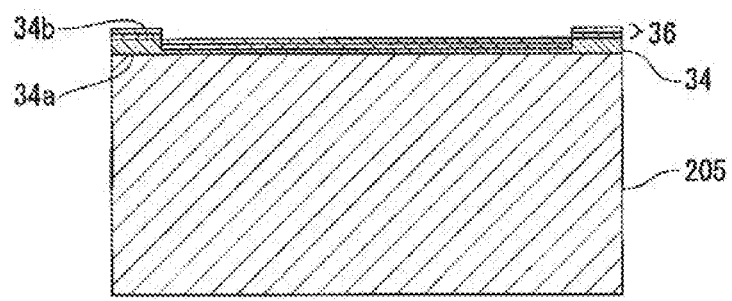
FIGS. 15A to 15C are schematic diagrams for describing the method of manufacturing the dielectric multilayer film filter illustrated in FIGS. 7A and 7B.
Figure 15B:
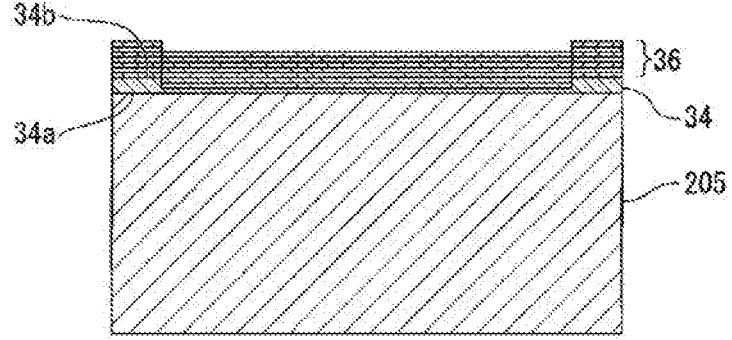
Figure 15C:
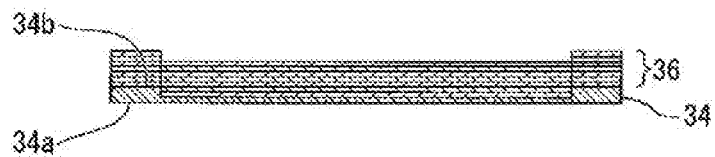
Figure 16:
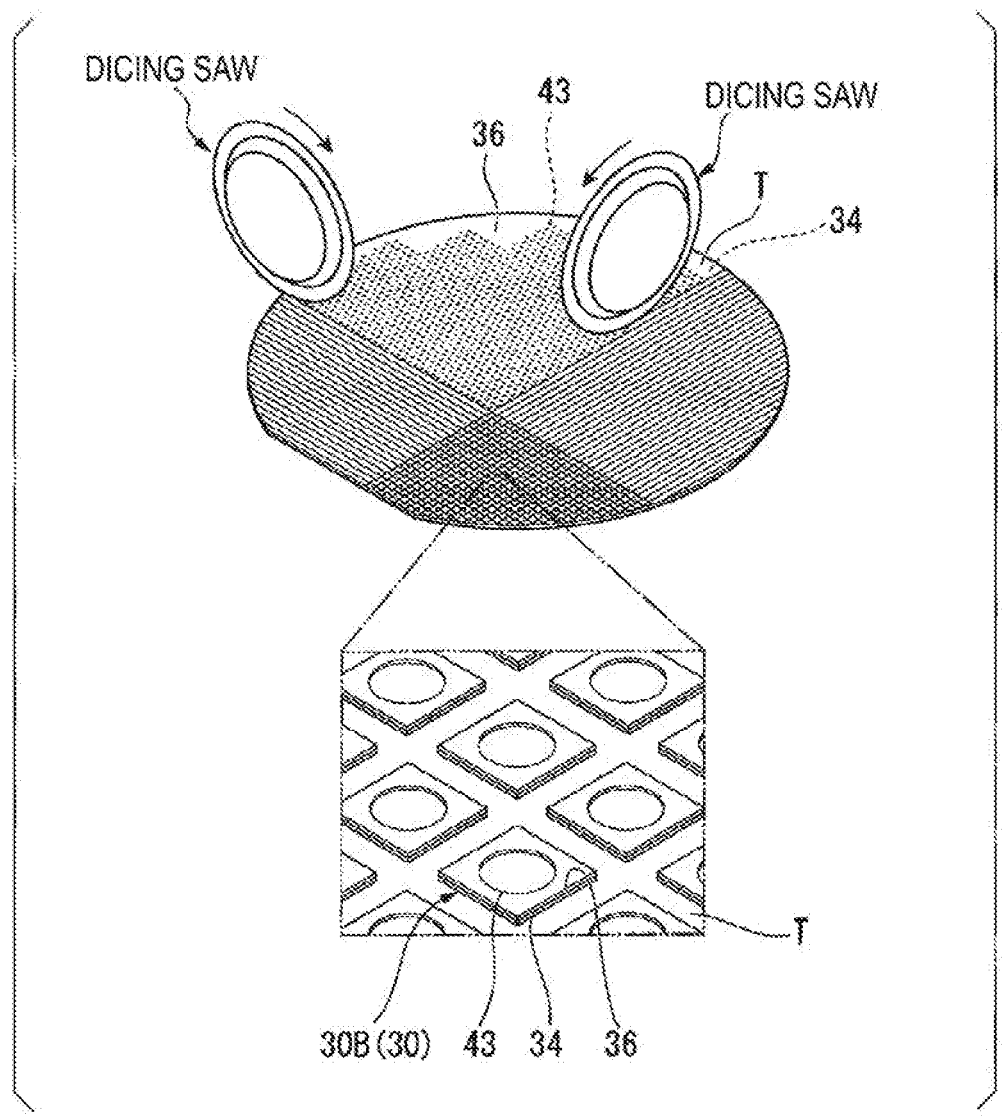
FIG. 16 is a schematic diagram for describing the method of manufacturing the dielectric multilayer film filter illustrated in FIGS. 7A and 7B.

An example of a method of manufacturing the dielectric multilayer film filter 30B of a support layer direct processing type is illustrated in FIG. 13 to FIG. 16. In the method of manufacturing the support layer direct processing type, first, as illustrated in FIG. 13 and FIGS. 14A and 14B, the polyimide resin P as the support layer 34 is applied by spin coating on a substrate 205 on which a mirror surface finish is made. In the present manufacturing method, the recess processing is directly performed on a layer of the polyimide resin P (hereinafter, a polyimide layer). In a case where photosensitive polyimide is used as the polyimide resin P, the depth of the recess 43 is adjusted by appropriately adjusting the amount of exposure using a photomask. In addition, in a case where the recess processing is performed after curing of the polyimide resin P, a photoresist is separately applied on the polyimide layer, a recess pattern is transferred by photolithography, and etching is performed as illustrated in FIG. 14C. The depth of the recess 43 is adjusted by the amount of etching time. In any of the cases, the amount of etching time is adjusted such that the support layer 34 of approximately 1 μm remains on the bottom surface of the recess 43 in the same manner as the method of manufacturing the substrate transfer type. Then, as illustrated in FIGS. 15A and 15B, the dielectric multilayer film 36 is deposited on the surface 34b of the support layer 34, and the substrate 205 is peeled from the support layer 34 as illustrated in FIG. 15C in the same manner as the method of manufacturing the substrate transfer type. Then, as illustrated in FIG. 16, chips are formed by dicing.

The refractive indexes of the cores of the input-side GI fiber 15 and the output-side GI fiber 16 and the dielectric multilayer film 36 are approximately 1.5. However, in a case where the end surfaces 15f and 16f of the input-side GI fiber 15 and the output-side GI fiber 16 abut perpendicular to the dielectric multilayer film filter 30, there is a possibility of Fresnel reflection having relative intensity of −30 dB due to a slight difference in refractive index. In a case where a device such as a laser oscillator or an optical amplifier on which incidence of reflective light is not preferable is arranged on the input side (that is, an end portion side of the input-side optical fiber 11 on the opposite side from the end portion to which the input-side GI fiber 15 is joined by fusion), it is necessary to sufficiently reduce the intensity of reflective light on the input side of the input-side optical fiber 11. As a method of reducing the intensity of reflective light, a method of inclining a connection end surface is effective. In the case of a general dielectric multilayer film using an oxide film, a reflection attenuation amount can be increased to approximately 60 dB by inclining the surface of the dielectric multilayer film by approximately 5° with respect to the optical axis. An angle necessary for obtaining a sufficient reflection attenuation amount depends on the refractive index of each of elements such as the optical fiber, the dielectric multilayer film, and the optical adhesive and is 10° at most and typically approximately 5°.

Figure 17:
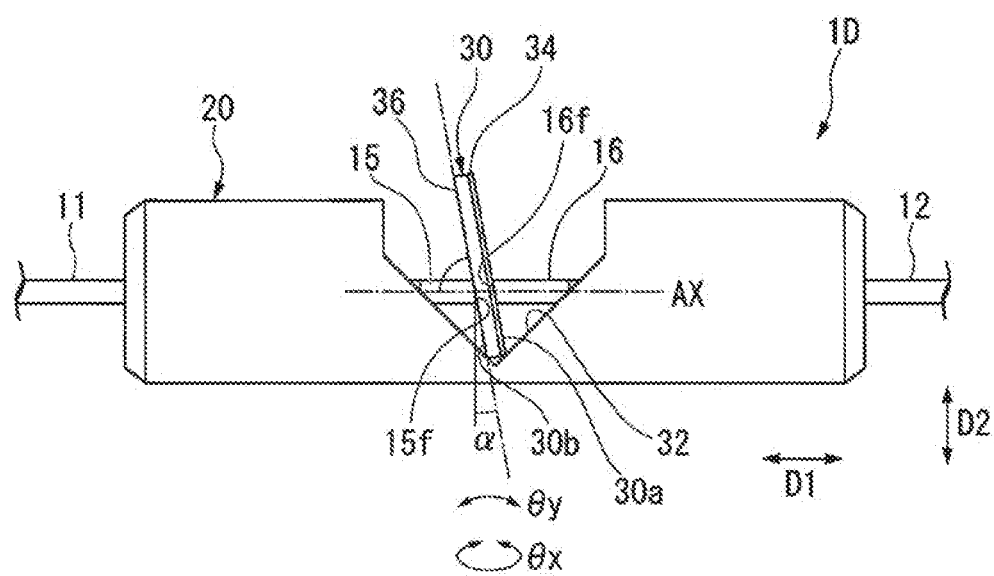
FIG. 17 is a side view of a fiber module of a fourth aspect according to the present disclosure.
Figure 18:
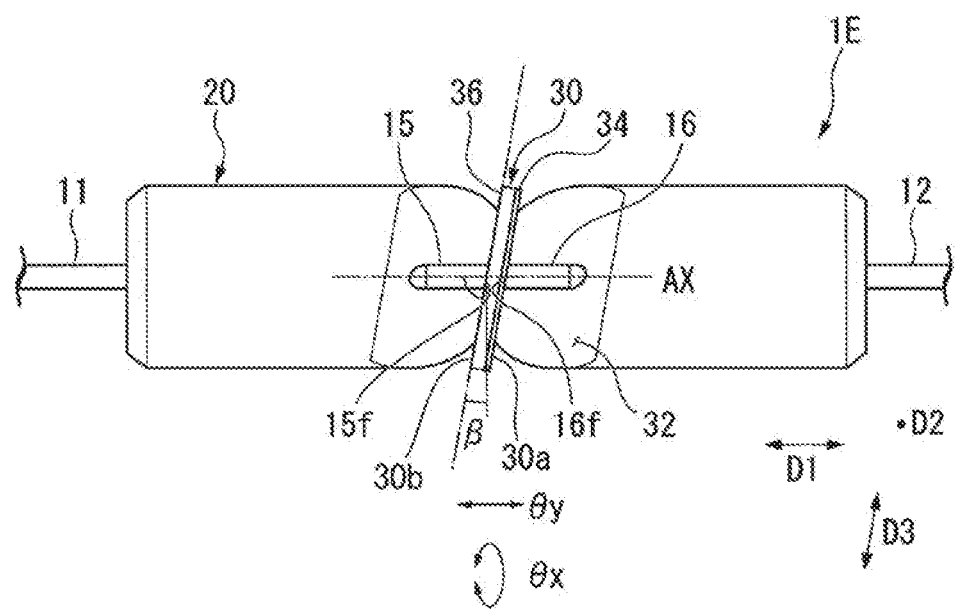
FIG. 18 is a plan view of a fiber module of a fifth aspect according to the present disclosure.

FIG. 17 illustrates a structure of a fiber module 1D of a fourth aspect in which the dielectric multilayer film filter 30 is inclined in a θy direction, and FIG. 18 illustrates a structure of a fiber module 1E of a fifth aspect in which the dielectric multilayer film filter 30 is inclined in a θx direction. In the fiber modules 1D and 1E, the end surfaces 15f and 16f of the input-side GI fiber 15 and the output-side GI fiber 16 are cut in advance such that the end surfaces 15f and 16f are inclined at 5° with respect to the cross-sectional direction (85° with respect to the longitudinal direction), and are optically polished.

As illustrated in FIG. 17, in the fiber module 1D, the dielectric multilayer film filter 30 is arranged in the groove 32 having a V shape in a side view in the same manner as the fiber module 1B illustrated in FIG. 4A. The dielectric multilayer film filter 30 is interposed between the input-side GI fiber 15 and the output-side GI fiber 16 and is fixed using an ultraviolet curing resin (not illustrated) such that the end surfaces 15f and 16f and surfaces 30a and 30b are inclined at an inclination angle α of greater than or equal to 5° and less than or equal to 10° in the θy direction in a side view with respect to the plane orthogonal to the longitudinal direction D1

Figure 19:
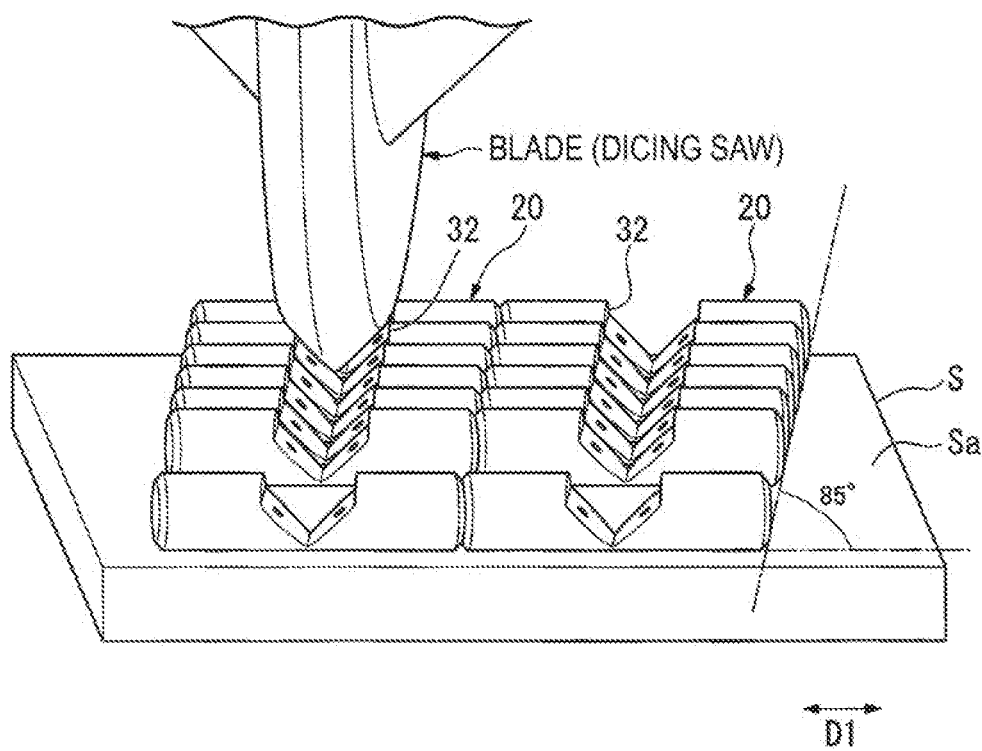
FIG. 19 is a perspective view for describing a method of forming a groove of the fiber module illustrated in FIG. 18.

As illustrated in FIG. 18, in the fiber module 1E, the dielectric multilayer film filter 30 is arranged in the groove 32 having a V shape in a side view in the same manner as the fiber module 1B illustrated in FIG. 4A. The dielectric multilayer film filter 30 is interposed between the input-side GI fiber 15 and the output-side GI fiber 16 and is fixed using an ultraviolet curing resin (not illustrated) such that the end surfaces 15f and 16f and surfaces 30a and 30b are inclined at an inclination angle β of greater than or equal to 5° and less than or equal to 10° in the θx direction in a plan view with respect to the plane orthogonal to the longitudinal direction D1 For example, the groove 32 of the fiber module 1E illustrated in FIG. 18 can be formed as illustrated in FIG. 19. As illustrated in FIG. 19, end portions of a plurality of ferrules 20 are arranged on a stage S at a position forming an angle of 85° with respect to the longitudinal direction D1 on a top surface Sa of the stage S. The groove 32 can be formed in the ferrules 20 by moving a dicing saw along the position forming an angle of 85° with respect to the longitudinal direction D1.

As described above, the fiber modules 1A, 1B, 1C, 1D, and 1E of the present embodiment includes the input-side optical fiber 11, the output-side optical fiber 12, the ferrule 20 in which the input-side optical fiber 11 and the output-side optical fiber 12 are insertable in both ends and the groove 32 is formed in the cross-sectional direction D2, the dielectric multilayer film filter 30 inserted in the groove 32, and the input-side GI fiber 15 and the output-side GI fiber 16 joined by fusion to the respective terminal portions of the input-side optical fiber 11 and the output-side optical fiber 12. The dielectric multilayer film filter 30 is interposed between the end surface 15f of the input-side GI fiber 15 and the end surface 16f of the output-side GI fiber 16 in the longitudinal direction D1. According to such a configuration, light is unlikely to be diffused, and an increase in optical loss can be reduced. Both the small size and inexpensiveness and the rectangular light distribution characteristics having a steep rise and fall can be established.

In addition, in the fiber modules 1A, 1B, 1C, 1D, and 1E of the present embodiment, the length of the input-side GI fiber 15 is adjusted such that luminous flux emitted from the end surface of the input-side optical fiber 11 forms a beam waist at the position of the dielectric multilayer film filter 30, and the length of the output-side GI fiber 16 is adjusted such that luminous flux passing through the dielectric multilayer film filter 30 is coupled to the output-side optical fiber 12 at a predetermined coupling efficiency. According to such a configuration, the optical loss between input and output can be more favorably reduced.

In addition, according to the fiber modules 1B, 1C, 1D, and 1E of the present embodiment, the cross section of a lower portion of the groove 32 has a V shape, and the dielectric multilayer film filter 30 is fitted in the bottom portion of the groove 32. Thus, at least one degree of freedom of two degrees of freedom of the angle formed between the dielectric multilayer film filter 30 and the optical axis AX can be fixed, and manufacturing is facilitated.

In addition, according to the fiber modules 1B and 1C of the present embodiment, the dielectric multilayer film filter 30 includes a thin-film portion 44 that includes the region 40 and is thinner than its surrounding part. Thus, both reduction of the optical insertion loss and workability can be established.

In addition, in the fiber modules 1D and 1E of the present embodiment, the dielectric multilayer film filter 30 is arranged inclined at greater than or equal to 5° and less than or equal to 10° with respect to a plane orthogonal to the optical axis AX. The end surfaces 15f and 16f of the input-side GI fiber 15 and the output-side GI fiber 16 abut on the dielectric multilayer film filter 30 while inclined at greater than or equal to 5° and less than or equal to 10° with respect to the plane orthogonal to the optical axis AX and are optically polished. According to such a configuration, the intensity of reflective light on the input side of the input-side optical fiber 11 and the output side of the output-side optical fiber 12 can be sufficiently reduced.

Furthermore, according to the fiber module 1E of the present embodiment, an extending direction D3 (refer to FIG. 18) of the groove 32 forms an angle of greater than or equal to 80° and less than or equal to 90° in a plan view with respect to the longitudinal direction D1 of the ferrule 20. Thus, the intensity of reflective light can be more securely reduced.

While a preferred embodiment of the present disclosure has been described above, the present disclosure is not limited to a specific embodiment and can be subjected to various modifications and changes within the scope of the gist of the present disclosure disclosed in the claims.

REFERENCE SIGNS LIST 1A, 1B, 1C, 1D, 1E Fiber module
11 Input-side optical fiber
12 Output-side optical fiber
15 Input-side GI fiber
15f End surface
16 Output-side GI fiber
16f End surface
20 Ferrule
30 Dielectric multilayer film filter
32 Groove
D1 Longitudinal direction

The invention claimed is:
1. A fiber module comprising:
an input-side optical fiber;
an output-side optical fiber;
a ferrule in which the input-side optical fiber and the output-side optical fiber are insertable in both ends and includes a V-shaped groove formed in a direction orthogonal to a longitudinal direction;
a dielectric multilayer film filter inserted in the V-shaped groove and arranged inclined at greater than or equal to 5° and less than or equal to 10° with respect to a plane orthogonal to an optical axis; and an input-side graded index fiber and an output-side graded index fiber joined by fusion to respective terminal portions of the input-side optical fiber and the output-side optical fiber, wherein the dielectric multilayer film filter is interposed between an end surface of the input-side graded index fiber and an end surface of the output-side graded index fiber in the longitudinal direction, and the end surface of each of the input-side graded index fiber and the output-side graded index fiber abuts the dielectric multilayer film filter while the dielectric multilayer film is inclined at greater than or equal to 5° and less than or equal to 10° with respect to the plane orthogonal to the optical axis and are optically polished.

2. The fiber module according to claim 1, wherein a length of the input-side graded index fiber is such that luminous flux emitted from an end surface of the input-side optical fiber forms a beam waist at a position of the dielectric multilayer film filter, and a length of the output-side graded index fiber is such that luminous flux passing through the dielectric multilayer film filter is coupled to the output-side optical fiber at a predetermined coupling efficiency.

3. The fiber module according to claim 1, wherein the dielectric multilayer film filter is fitted in a bottom portion of the V-shaped groove.

4. The fiber module according to claim 1, wherein the dielectric multilayer film filter includes a thin-film portion that is thinner than a surrounding part.

5. The fiber module according to claim 1, wherein an extending direction of the V-shaped groove forms an angle of greater than or equal to 80° and less than or equal to 90° with respect to the longitudinal direction of the ferrule.

6. The fiber module according to claim 1, wherein the ferrule is made of zirconia.

7. The fiber module according to claim 1 wherein the dielectric multilayer film filter is fixed within the V-shaped groove using an optical adhesive.

8. The fiber module according to claim 1 wherein the dielectric multilayer film includes a thinned polyimide film disposed on one of a quartz substrate, a glass substrate, and a silicon substrate, wherein a first thickness of the thinned polyimide film is less than a second thickness of the polyimide film at formation on the one of the quartz, glass, and silicon substrate.

9. The fiber module according to claim 8 wherein the second thickness is approximately 1 micrometer.

10. The fiber module according to claim 8 wherein the dielectric multilayer film further includes a photoresist applied on the polyimide film.

11. The fiber module according to claim 1 wherein refractive indexes of cores of the input-side graded index fiber, the output-side graded index fiber, and the dielectric multilayer film are approximately 1.5.

12. The fiber module according to claim 1 wherein the dielectric multilayer film includes an oxide film.

* * * * *